US012799045B2

(12) United States Patent
Li et al.

(10) Patent No.: US 12,799,045 B2
(45) Date of Patent: Nov. 17, 2026

(54) LIGNIN-CLAY BASED COATING FOR SLOW RELEASE FERTILIZER

(71) Applicant: University of Florida Research Foundation, Inc., Gainesville, FL (US)

(72) Inventors: Yuncong Li, Palmetto Bay, FL (US); Shanyu Meng, Gainesville, FL (US); Zhaohui Tong, Newberry, FL (US); Shugang Zhang, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 775 days.

(21) Appl. No.: 18/268,301

(22) PCT Filed: Dec. 20, 2021

(86) PCT No.: PCT/US2021/073027
§ 371 (c)(1),
(2) Date: Jun. 19, 2023

(87) PCT Pub. No.: WO2022/140758
PCT Pub. Date: Jun. 30, 2022

(65) Prior Publication Data

US 2024/0067582 A1 Feb. 29, 2024

Related U.S. Application Data

(60) Provisional application No. 63/129,099, filed on Dec. 22, 2020.

(51) Int. Cl.
*C05C 9/00* (2006.01)
*C05G 5/30* (2020.01)

(52) U.S. Cl.
CPC . *C05G 5/37* (2020.02); *C05C 9/00* (2013.01)

(58) Field of Classification Search
CPC .................................. C05G 5/37; C05C 9/00
See application file for complete search history.

(56) References Cited

U.S. PATENT DOCUMENTS

2014/0316080 A1 10/2014 Kramer et al.
2014/0331727 A1* 11/2014 Hargrove .......... C08G 18/3206 71/27

(Continued)

FOREIGN PATENT DOCUMENTS

CA 2111943 * 6/1998 .............. C05G 3/00
CN 107056468 A * 8/2017 .............. C05C 9/00

(Continued)

OTHER PUBLICATIONS

ISR Mailed May 6, 2022; International Patent Application PCT/US21/73027 Filed Dec. 20, 2021.

(Continued)

*Primary Examiner* — Wayne A Langel
(74) *Attorney, Agent, or Firm* — Thomas Horstemeyer LLP.

(57) ABSTRACT

The present disclosure provides for compositions, slow-release fertilizer composition, methods of making these compositions, and the like. The present disclosure can be advantageous in some instances since it can achieve multiple goals, where in one aspect, the 5 modified lignin is used to prepare materials with strong adsorption capacity to the heavy metals, and then the material is used to coat fertilizer to prepare controlled-release fertilizer. The application of embodiments of the coated fertilizer in soil not only control the release of nutrients and improve the fertilizer use efficiency, but also effectively adsorb heavy metals in soil and repair the polluted soil.

15 Claims, 6 Drawing Sheets

(56) References Cited

U.S. PATENT DOCUMENTS

| | | | | |
|---|---|---|---|---|
| 2022/0380677 | A1* | 12/2022 | Kalita | A01N 25/10 |
| 2024/0180161 | A1* | 6/2024 | Kalita | A01N 59/16 |

FOREIGN PATENT DOCUMENTS

| | | | | | |
|---|---|---|---|---|---|
| CN | 104649806 | B | * | 10/2017 | C05G 5/37 |
| CN | 111470905 | A | | 7/2020 | |
| JP | 2000109388 | | * | 10/2000 | C05G 5/37 |

OTHER PUBLICATIONS

Zhang, S et al. "Lignin-Clay Nanohybrid Biocomposite-Based Double-Layer Coating Materials for Controllable-Release Fertilizer". Sustainable chemistry & Engineering . . . Dec. 16, 2020; abstract; page B, col. 1, second paragraph; page B, col. 2, first-fifth and seventh-eight paragraphs; page C, col. 1, first paragraph; page C, table 1; page E, col. 1, second paragraph; page F, col. 1, first paragraph; p. G, col. 1, first paragraph; DOI: 10 1021 /acs-suschemeng .0c064 72.

Yang, Y-C et al. "Improving the Quality of Polymer-Coated Urea with Recycled Plastic, Proper Additives, and Large Tablets". Journal of Agricultural and Food Chemistry . . . Oct. 24, 2012; abstract; p. 11230, table 1; p. 11230, col. 2, second paragraph; p. 11231, col. 1, second paragraph; DOI: 10.1021/jf302813g.

* cited by examiner

LIGNIN-CLAY BASED COATING FOR SLOW RELEASE FERTILIZER

CLAIM OF PRIORITY TO RELATED APPLICATION

This application is the 35 U.S.C. § 371 national stage of PCT application having serial number PCT/US21/73027, filed on Dec. 20, 2021. This application (PCT/US21/73027) claims priority to U.S. provisional application entitled "Lignin-Clay Based Coating for Slow Release Fertilizer," having Ser. No. 63/129,099 filed on Dec. 22, 2020, which are entirely incorporated herein by reference.

FEDERAL FUNDING

This invention was made whole or in part with support received by National Academy of Sciences and the United States Agency for International Development, Grant No. 2000009141.

BACKGROUND

At present, the world has a population of more than 7 billion, so food supply is a strategic issue related to global security. Therefore, to increase grain yield and meet the food demand is the most important thing related to development and security. The key elements of food production are fertilizer and soil. The supply of fertilizer and the quality of soil not only determine the output of food, but also determine the quality and safety of food (Liu et al., 2018). However, there are some problems in production practice. First, the utilization rate of fertilizer nutrients in current agricultural production is low, resource waste is serious, and results in prominent non-point source pollution (Yang et al., 2005; Ministry of agriculture and rural areas, 2015). Therefore, it has become a hot spot in the process of efficient development of modern agriculture to improve the effective utilization of fertilizer nutrients by various technologies. Second, the heavy metal pollution of soil is very serious, which not only affects the environment and ecology, but also significantly affects the yield and quality of crops and people's life and health. It is an urgent worldwide problem to be solved (Bolana et al., 2014). In order to solve the above problems, scientists have done a lot of research, but most of the current research focuses on solving a single problem, that is, only to solve one of the problems of low fertilizer utilization rate or heavy metal pollution in soil. For example, coated slow-release fertilizer can effectively improve the utilization rate of fertilizer (Azeem et al., 2014; Kottegoda et al., 2017), but its coating materials mainly come from petrochemical products, which are non-renewable resources, resulting in high cost, limiting the large-scale promotion of controlled-release fertilizer (Xiao et al., 2017; Cruz et al., 2017; Chen et al, 2018); Recently, the main approach for the remediation of heavy metal pollution in soil include surface covering, soil washing, electric extraction, solidification, vitrification and phytoremediation (Khalid et al., 2017), but these methods are not effective and cost a lot of manpower and material resources, resulting in a large economic burden (Yao et al., 2012). The sustainable, cost-effective, and renewable biomaterials as controlled release and metal adsorption functions have potential to solve both problems simultaneously.

As one of the most abundant natural components in plants, lignin was important aromatic materials and widely distributed in plant cell wall (Ralph et al., 1997; Ragauskas et al., 2014; Liao et al., 2020). Lignin is also a cheap material, because it is usually used as agricultural waste or industrial waste in pulping and papermaking and some biorefining processes (albadarin et al., 2017; Schutyser et al., 2018; Jiang et al., 2019). In 2017, the world's symbiotic production of pulp caused about 130 million tons of lignin waste (Ge et al., 2018; Jin et al., 2019; supanchaiyamat et al., 2019), Therefore, lignin is considered as a low-cost, green, and sustainable resource to replace petrochemical products (Hu et al., 2018; llevot et al., 2018; Bai et al., 2019). In addition, lignin has become the focus of research due to its high carbon content, thermal stability, biodegradability, oxidation resistance and super hardness (Jairam et al., 2013; Budnyak et al., 2018; Patricia et al., 2018). Lignin contains a variety of complex polymer structures, including phenylpropane units whose side chains contain methoxy, phenolic hydroxyl, and aldehyde functional groups (Kaneko et al., 2016; leskinen et al., 2017; sun et al., 2018). It has been reported that lignin is used to prepare coated controlled-release fertilizer (Zhang et al., 2016b; Kai et al., 2016; Wang et al., 2018). Huang et al. (2018) used bioethanol and xylose acid from lignin of papermaking residue to prepare bio-based polymer slow-release nitrogen fertilizer, but the controlled-release effect was not ideal; Legras-Lecarpentier et al. (2019) synthesized 100% lignin coated slow-release fertilizer by enzymatic synthesis method, and its release longevity was only about 10-15 days; Fertahi et al. (2019) synthesized bio-based polymer by lignin and carrageenan. The release period of coated superphosphate was about 5 days. All the reported lignin based coated controlled-release fertilizers have the disadvantages of short nutrient controlled-release longevity (Wang et al., 2016). The main reason is that there are many hydrophilic groups in the bio-based membrane materials, which are easy to absorb water, resulting in poor quality of controlled release; The treatment of lignin is unreasonable, and the coating process is not standardized, resulting in poor quality of the coating, and the function of controlled release is not ideal. At present, most researches use lignin as adsorption materials to treat heavy metals in water, but there is no report on the treatment of heavy metals in soil. Zhang et al. (2019) synthesized lignin-based magnetic nanocomposites by using lignin, $Fe_3O_4$, nano-$SiO_2$, etc., with the adsorption capacity of 150.33 and 70.69 mg/g for $Pb^{2+}$ and $Cu^{2+}$ ions respectively; Li et al. (2016) synthesized modified lignin-based graphene, with the adsorption capacity of 385 mg/g for lead ions. Ponomareve et al. (2019) used lignin to synthesize biopolymer as adsorption material to adsorb nickel, cadmium, and lead. Popovic et al. (2019) synthesized amino lignin microspheres to remove heavy metals and achieved certain results. The above reports use lignin to synthesize complex nano particle structure to deal with heavy metals in water. Although it has achieved certain results, it still has high cost and complex technology.

The terrifically severe problems in modern agricultural production include low fertilizer utilization efficiency result in serious waste and environment pollution and heavy metal pollution of land. Slow and controlled release fertilizer can solve the problem of low fertilizer use efficiency alone and most of coating materials are expensive and non-renewable.

SUMMARY

Embodiments of the present disclosure provide for compositions, slow-release fertilizer composition, methods of making these compositions, and the like.

In an aspect, the present disclosure includes a composition comprising: a coating derived from a plurality of lignin-clay nanohybrids and polyurethane precursors; and a core comprising a fertilizer.

In an aspect, the present disclosure includes a slow-release fertilizer composition comprising: a coating comprising a plurality of lignin-clay nanohybrids and polyurethane; and a core comprising a fertilizer.

In an aspect, the present disclosure includes a method for making a slow-release fertilizer composition, comprising: preheating a fertilizer particle to a temperature of about 50-100° C.; adding a mixture to surface of the preheated fertilizer particle, wherein the mixture comprises a plurality of lignin-clay nanohybrids and polyurethane precursors; reacting the polyurethane precursors to form a coating on the fertilizer particle; and thereby forming a slow-release fertilizer composition. In addition, a slow-release fertilizer composition obtained by the methods described herein.

In an aspect, the present disclosure includes a composition comprising: a coating comprising lignin, clay, and polyurethane; and a core comprising a fertilizer.

BRIEF DESCRIPTION OF THE DRAWINGS

Further aspects of the present disclosure will be more readily appreciated upon review of the detailed description of its various embodiments, described below, when taken in conjunction with the accompanying drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
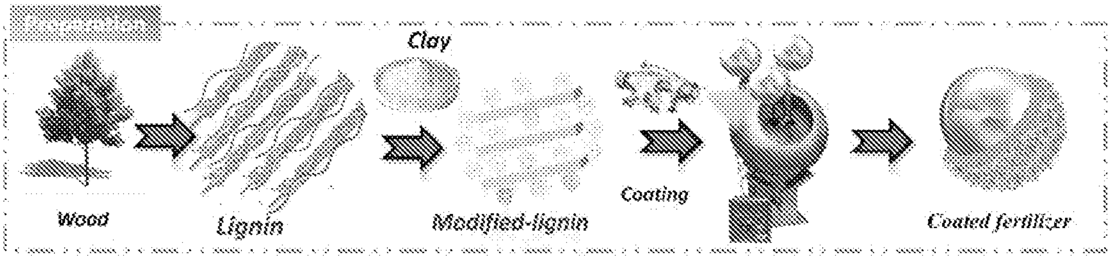
FIG. 1 shows preparation flow of coated fertilizer.

*BCU represents biopolyurethane Coated Urea fertilizer; LBCU is Lignin-clay plus Bio-polyurethane Coated Urea (LBCU); LBCU1 is the LBCU fertilizer with 10% lignin-clay hybrid, LBCU2 is the LBCU fertilizer with 20% lignin-clay hybrid, and LBCU3 is the LBCU fertilizer with 30% lignin-clay hybrid.

DETAILED DESCRIPTION

Definitions

For convenience, before further description of the present invention, certain terms used in the specification, examples and appended claims are collected here. It is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims. These definitions should be read in light of the remainder of the disclosure and understood as by a person of skill in the art. Unless defined otherwise, all technical and scientific terms used herein have the same meaning as commonly understood by a person of ordinary skill in the art. The terms used throughout this specification are defined as follows, unless otherwise limited in specific instances.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, biochemistry, molecular biology, genetics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

The terms "comprise", "comprising", "including" "containing", "characterized by", and grammatical equivalents thereof are used in the inclusive, open sense, meaning that additional elements may be included. It is not intended to be construed as "consists of only."

As used herein, the terms "polyol" refers to a compound comprising at least two hydroxyl groups, at least three hydroxyl groups, at least four hydroxyl groups, or more. A biopolyol can be obtained from a plant cell, a microbe or an animal cell, or can be made synthetically based thereon. A biopolyol is one which is biodegradable and generally, readily metabolizable or degraded, for example, by microbial action or digestive processes. A biopolyol is one which normally is not overtly toxic and does not carry an overt negative environmental impact, except, perhaps when present in high or supraphysiological concentrations.

Discussion

Embodiments of the present disclosure provide for compositions, slow-release fertilizer composition, methods of making these compositions, and the like. The present disclosure is advantageous in that it can achieve multiple goals, where in one aspect, the modified lignin is used to prepare materials with strong adsorption capacity to the heavy metals, and then the material is used to coat fertilizer to prepare controlled-release fertilizer. The application of embodiments of the coated fertilizer in soil can not only control the release of nutrients and improve the fertilizer use efficiency, but also effectively adsorb heavy metals in soil and repair the polluted soil.

In an aspect, the present disclosure provides for compositions including a coating derived from a plurality of lignin-clay nanohybrids and polyurethane precursors; and a core comprising a fertilizer. The lignin-clay nanohybrid can be derived from modified lignin and clay. The polyurethane can be derived from precursors such as a polyol and a polyisocyanate. The polyisocyanate can be selected from the group consisting of diphenylmethane diisocyanate, toluene diisocyanate, polymers thereof, and mixtures thereof. The polyisocyanate can be diphenylmethane diisocyanate. The polyol can be biopolyol. The polyol can be derived from liquefied peanut shell. In one embodiment, the lignin-clay nanohybrid can be derived from quaternary ammonium lignin and clay. The quaternary ammonium lignin can be derived from lignin and 2,3-epoxypropyl trimethylammonium chloride. The clay can be selected from the group consisting of a zeolite, a bentonite, an aluminosilicate, a montmorillonite, a smectite, a kaolinite, an organoclay, and mixtures thereof. In one embodiment, the clay is bentonite.

In one embodiment, the lignin compound can be about 20 wt % to about 50 wt %, about 30 wt % to about 50 wt %, about 35 wt % to about 45 wt %, about 20 wt % to about 25 wt %, about 25 wt % to about 30 wt %, about 30 wt % to about 35 wt %, about 35 wt % to about 40 wt %, about 40 wt % to about 45 wt %, about 45 wt % to about 50 wt %, about 20 wt %, about 25 wt %, about 30 wt %, about 35 wt %, about 40 wt %, about 45 wt %, or about 50 wt % of the lignin-clay nanohybrid.

In one embodiment, the lignin-clay nanohybrid can be about 1 wt % to about 40 wt % about 5 wt % to about 35 wt %, about 10 to about 30 wt %, about 1 to about 5 wt %, about 5 to about 10 wt %, about 10 to about 15 wt %, about 15 to about 20 wt %, about 20 to about 25 wt %, about 25 to about 30 wt %, about 30 to about 35 wt %, about 35 to about 40 wt %, about 1 wt %, about 5 wt %, about 10 wt %, about 15 wt %, about 20 wt %, about 25 wt %, about 30 wt %, about 35 wt %, or about 40 wt % of the coating.

In one embodiment, the polyurethane can be about 1 wt % to about 40 wt % about 5 wt % to about 35 wt %, about 10 to about 30 wt %, about 1 to about 5 wt %, about 5 to about 10 wt %, about 10 to about 15 wt %, about 15 to about 20 wt %, about 20 to about 25 wt %, about 25 to about 30 wt %, about 30 to about 35 wt %, about 35 to about 40 wt %, about 1 wt %, about 5 wt %, about 10 wt %, about 15 wt %, about 20 wt %, about 25 wt %, about 30 wt %, about 35 wt %, or about 40 wt % of the coating.

In one embodiment, the coating can be about 0.1 wt % to about 20 wt %, about 0.1 wt % to about 15 wt %, about 0.1 wt % to about 10 wt %, about 0.1 wt % to about 8 wt %, about 0.5 wt % to about 5 wt %, about 0.5 wt % to about 2 wt %, about 0.1 wt % to about 5 wt %, about 5 wt % to about 10 wt %, about 10 wt % to about 15 wt %, about 15 wt % to about 20 wt %, about 0.1 wt %, about 0.5 wt %, about 1 wt %, about 3 wt %, about 5 wt %, about 8 wt %, or about 10 wt of the composition.

In one embodiment, the core can be about 80 wt % to about 99.9 wt %, about 85 wt % to about 99.9 wt %, about 90 wt % to about 99.9 wt %, about 92 wt % to about 99.9 wt %, about 95 wt % to about 99.5 wt %, about 98 wt % to about 99.5 wt %, about 90 wt % to about 95 wt %, about 85 wt % to about 90 wt %, about 80 wt % to about 85 wt % of the composition.

In one embodiment, the fertilizer can be about 80 wt % to about 99.9 wt %, about 85 wt % to about 99.9 wt %, about 90 wt % to about 99.9 wt %, about 92 wt % to about 99.9 wt %, about 95 wt % to about 99.5 wt %, about 98 wt % to about 99.5 wt %, about 90 wt % to about 95 wt %, about 85 wt % to about 90 wt %, about 80 wt % to about 85 wt % of the core.

In one embodiment, the size of the lignin-clay nanohybrid can be about 100 nm to about 3000 nm, about 200 nm to about 2000 nm, about 300 nm to about 1800 nm, about 500 nm to about 1500 nm, or about 800 nm to about 1000 nm.

In one embodiment, the fertilizer is a water-soluble compound having nitrogen, phosphorous, or potassium. In one embodiment, the fertilizer is urea.

In one aspect, the present disclosure provides a slow-release fertilizer composition including a coating comprising a plurality of lignin-clay nanohybrids and polyurethane; and a core comprising a fertilizer, where each component is described herein. The "slow-release" can be measure over the time frame of days to weeks to months depending upon the specific application. For example, the slow-release can be over a time frame of about 1 to 15 days or about 3 to 15 days. In another example, the slow-release can be over a time frame of about 1 to 21 days or 1 to 90 days or about 3 to 21 days or 3 to 90 days. In another example, the slow-release can be over a time frame of about 1 to 120 days or 1 to 180 days or about 3 to 120 days or 3 to 180 days.

In one aspect, the present disclosure provides a method for making a slow-release fertilizer composition. The method includes the steps of preheating a fertilizer particle to a temperature from about 50° C. to about 100° C.; adding a mixture to surface of the preheated fertilizer particle, wherein the mixture comprises a plurality of lignin-clay nanohybrids and polyurethane precursors; reacting the polyurethane precursors to form a coating on the fertilizer particle; and thereby forming a slow-release fertilizer composition.

In one embodiment, the fertilizer particle is preheated to a temperature about 50° C. to about 90° C., about 50° C. to about 80° C., about 50° C. to about 75° C., about 65° C. to about 75° C., about 60° C., about 65° C., about 70° C., about 75° C., or about 80° C.

In one embodiment, the mixture further comprises a cross-linking agent. In one embodiment, the cross-linking agent is N, N-methylene-bis-acrylamide. In one embodiment, wherein the adding step and reacting step are repeated 2-10 times, optionally 2-8 times, 2-5 times, 2 times, 3 times, 4 times, 5 times, 6 times, 7 times, 8 times, 9 times, or 10 times. In one embodiment, a rotating drum is used in at least one of the adding step and the reacting step. In one embodiment, the fertilizer particle is selected from the group comprising granules, chunky granules, prills, pellets, extrusion, shot, lumps, grains, crystals, and flakes. In one embodiment, the fertilizer particle is a prill. In one embodiment, the lignin-clay nanohybrid is derived from modified lignin and clay.

In one embodiment, the polyurethane precursors comprise polyol and polyisocyanate. In particular, polyol and polyisocyanate can be reacted to form polyurethane. In one embodiment, the polyisocyanate can be selected from the group consisting of diphenylmethane diisocyanate, toluene diisocyanate, polymers thereof, and mixtures thereof. In one embodiment, the polyisocyanate can be diphenylmethane diisocyanate. In one embodiment, the polyol can be biopolyol. In one embodiment, the polyol can be derived from liquefied peanut shell. In one embodiment, the lignin-clay nanohybrid can be derived from quaternary ammonium lignin and clay. In one embodiment, the clay can be selected from the group consisting of a zeolite, a bentonite, an aluminosilicate, a montmorillonite, a smectite, a kaolinite, an organoclay, and mixtures thereof. In one embodiment, the clay is bentonite.

In one embodiment, the lignin compound in the lignin-clay hybrid can be about 20 wt % to about 50 wt %, about 30 wt % to about 50 wt %, about 35 wt % to about 45 wt %, about 20 wt % to about 25 wt %, about 25 wt % to about 30 wt %, about 30 wt % to about 35 wt %, about 35 wt % to about 40 wt %, about 40 wt % to about 45 wt %, about 45 wt % to about 50 wt %, about 20 wt %, about 25 wt %, about 30 wt %, about 35 wt %, about 40 wt %, about 45 wt %, or about 50 wt % of the lignin-clay nanohybrid.

In one embodiment, the lignin-clay nanohybrid can be about 1 wt % to about 40 wt %, about 5 wt % to about 35 wt %, about 10 to about 30 wt %, about 1 to about 5 wt %, from about 5 to about 10 wt %, about 10 to about 15 wt %, about 15 to about 20 wt %, about 20 to about 25 wt %, about 25 to about 30 wt %, about 30 to about 35 wt %, about 35 to about 40 wt %, about 1 wt %, about 5 wt %, about 10 wt %, about 15 wt %, about 20 wt %, about 25 wt %, about 30 wt %, about 35 wt %, or about 40 wt % of the coating.

In one embodiment, the polyurethane can be about 1 wt % to about 40 wt % about 5 wt % to about 35 wt %, about 10 to about 30 wt %, about 1 to about 5 wt %, about 5 to about 10 wt %, about 10 to about 15 wt %, about 15 to about 20 wt %, about 20 to about 25 wt %, about 25 to about 30 wt %, about 30 to about 35 wt %, about 35 to about 40 wt %, about 1 wt %, about 5 wt %, about 10 wt %, about 15 wt %, about 20 wt %, about 25 wt %, about 30 wt %, about 35 wt %, or about 40 wt % of the coating.

In one embodiment, the coating can be about 0.1 wt % to about 20 wt %, about 0.1 wt % to about 15 wt %, about 0.1 wt % to about 10 wt %, about 0.1 wt % to about 8 wt %, about 0.5 wt % to about 5 wt %, about 0.5 wt % to about 2 wt %, about 0.1 wt % to about 5 wt %, about 5 wt % to about 10 wt %, about 10 wt % to about 15 wt %, about 15 wt % to about 20 wt %, about 0.1 wt %, about 0.5 wt %, about 1 wt %, about 3 wt %, about 5 wt %, about 8 wt %, or about 10 wt of the composition.

In one embodiment, the fertilizer can be about 80 wt % to about 99.9 wt %, about 85 wt % to about 99.9 wt %, about 90 wt % to about 99.9 wt %, about 92 wt % to about 99.9 wt %, about 95 wt % to about 99.5 wt %, about 98 wt % to about 99.5 wt %, about 90 wt % to about 95 wt %, about 85 wt % to about 90 wt %, about 80 wt % to about 85 wt % of the core.

In one embodiment, the core can be about 80 wt % to about 99.9 wt %, about 85 wt % to about 99.9 wt %, about 90 wt % to about 99.9 wt %, about 92 wt % to about 99.9 wt %, about 95 wt % to about 99.5 wt %, about 98 wt % to about 99.5 wt %, about 90 wt % to about 95 wt %, about 85 wt % to about 90 wt %, about 80 wt % to about 85 wt % of the composition.

In one embodiment, the size of the lignin-clay nanohybrid can be about 100 nm to about 3000 nm, about 200 to about 2000 nm, about 300 to about 1800 nm, about 500 to about 1500 nm, or about 800 to about 1000 nm.

In one embodiment, the fertilizer particle comprises a water soluble compound having nitrogen, phosphorous, or potassium. In one embodiment, the fertilizer particle comprises urea.

In one aspect, the present disclosure provides a composition (e.g., slow-release fertilizer composition) including a coating comprising lignin (e.g., as described herein in relation to various embodiments), clay (e.g., as described herein in relation to various embodiments), and polyurethane (e.g., as described herein in relation to various embodiments); and a core comprising a fertilizer (e.g., as described herein in relation to various embodiments).

In one embodiment, the lignin compound can be about 20 wt % to about 50 wt %, about 30 wt % to about 50 wt %, about 35 wt % to about 45 wt %, about 20 wt % to about 25 wt %, about 25 wt % to about 30 wt %, about 30 wt % to about 35 wt %, about 35 wt % to about 40 wt %, about 40 wt % to about 45 wt %, about 45 wt % to about 50 wt %, about 20 wt %, about 25 wt %, about 30 wt %, about 35 wt %, about 40 wt %, about 45 wt %, or about 50 wt % of the coating.

In one embodiment, the clay can be about 1 wt % to about 40 wt % about 5 wt % to about 35 wt %, about 10 to about 30 wt %, about 1 to about 5 wt %, about 5 to about 10 wt %, about 10 to about 15 wt %, about 15 to about 20 wt %, about 20 to about 25 wt %, about 25 to about 30 wt %, about 30 to about 35 wt %, about 35 to about 40 wt %, about 1 wt %, about 5 wt %, about 10 wt %, about 15 wt %, about 20 wt %, about 25 wt %, about 30 wt %, about 35 wt %, or about 40 wt % of the coating.

In one embodiment, the polyurethane can be about 1 wt % to about 40 wt % about 5 wt % to about 35 wt %, about 10 to about 30 wt %, about 1 to about 5 wt %, about 5 to about 10 wt %, about 10 to about 15 wt %, about 15 to about 20 wt %, about 20 to about 25 wt %, about 25 to about 30 wt %, about 30 to about 35 wt %, about 35 to about 40 wt %, about 1 wt %, about 5 wt %, about 10 wt %, about 15 wt %, about 20 wt %, about 25 wt %, about 30 wt %, about 35 wt %, or about 40 wt % of the coating.

In one embodiment, the coating can be about 0.1 wt % to about 20 wt %, about 0.1 wt % to about 15 wt %, about 0.1 wt % to about 10 wt %, about 0.1 wt % to about 8 wt %, about 0.5 wt % to about 5 wt %, about 0.5 wt % to about 2 wt %, about 0.1 wt % to about 5 wt %, about 5 wt % to about 10 wt %, about 10 wt % to about 15 wt %, about 15 wt % to about 20 wt %, about 0.1 wt %, about 0.5 wt %, about 1 wt %, about 3 wt %, about 5 wt %, about 8 wt %, or about 10 wt of the composition.

In one embodiment, the fertilizer can be about 80 wt % to about 99.9 wt %, about 85 wt % to about 99.9 wt %, about 90 wt % to about 99.9 wt %, about 92 wt % to about 99.9 wt %, about 95 wt % to about 99.5 wt %, about 98 wt % to about 99.5 wt %, about 90 wt % to about 95 wt %, about 85 wt % to about 90 wt %, about 80 wt % to about 85 wt % of the core.

In one embodiment, the core can be about 80 wt % to about 99.9 wt %, about 85 wt % to about 99.9 wt %, about 90 wt % to about 99.9 wt %, about 92 wt % to about 99.9 wt %, about 95 wt % to about 99.5 wt %, about 98 wt % to about 99.5 wt %, about 90 wt % to about 95 wt %, about 85 wt % to about 90 wt %, about 80 wt % to about 85 wt % of the composition.

Examples

Example 1

Brief Introduction:

This example provides an innovative strategy of achieving two goals with one stone. In this study, the modified lignin was used to prepare materials with strong adsorption capacity to the heavy metals, and then the material was used to coat fertilizer to prepare controlled-release fertilizer. The application of this new coated fertilizer in soil can not only control the release of nutrients and improve the fertilizer use efficiency, but also effectively adsorb heavy metals in soil and repair the polluted soil. In addition, the mechanism of nutrient regulation mechanism and heavy metal adsorption mechanism was explored, and the key research is as follows: (1) to explore the lignin was modified by different modified materials, and to explore its adsorption and film-forming capacity; (2) to reveal effect of soil environment on the nutrient regulation mechanism and the heavy metals adsorption mechanism of new coated materials. It is expected that the research develop a novel, low-cost, biodegradable and multi-functional lignin based coating material with adsorption and repairing capacity, and reveal its nutrient regulation mechanism and heavy metal adsorption mechanism, which could effectively solve the problem of low fertilizer use efficiency and land heavy metal pollution, and provide technical and theoretical support for the industrial application of the new coated fertilizer.

Introduction:

This example proposes a new strategy of achieving two goals with one stone, the preparation of a modified lignin base of new membrane materials and applied to the preparation of coated fertilizer. Because of the large specific surface area contact site, this kind of material that is derived from renewable biological materials had the stronger adsorption to the heavy metals, which is renewable low cost, easy degradation, therefore, this new coated fertilizer was applied to the soil can not only effectively improve the utilization rate of fertilizer, but also can efficiently adsorb heavy metals in soil and remediation of contaminated soil. In this study, the nutrient regulation mechanism of the soil environment on the new coated fertilizer and the adsorption mechanism of the material to heavy metals were investigated. Expect the results to the preparation of novel, low cost and biodegradable, multi-function type adsorption repair, lignin-based coating materials and reveal its nutrient regulation mechanism and adsorption mechanism of heavy metals, which can effectively solve the low utilization rate of fertilizer waste pollution and soil heavy metal pollution, which provides technical and theoretical support for the industrialization application of coated fertilizer.

Materials and Methods

Materials. Peanut shell (PS), collected from a farm in Gainesville, Florida, United states was milled and then passed through a 40 mesh sieve. Sulfuric acid (97%, v/v), polyethylene glycol (99%), N,N'-methylenebisacrylamide (MBA, 99%) were purchased from Fisher Scientific. Methyleneblue, Zinc chloride, Ferric chloride and Copper chloride were obtained from Sigma-Aldrich. Diphenylmethane diisocyanate (MDI) with 30.03 wt. % NCO group was obtained from Yantai Wanhua Polyurethane Co., Ltd. (Shandong, China). The lignin used was got from a lab of UF/IFAS Agriculture and Biology Engineering department. Bentonite clay was purchased from Southern Clay Products, Inc. Urea prills (3-5 mm in diameter and 46% N) was provided by Dr. Li in Homestead.

Preparation of Lignin-Clay. Firstly, 68.5 mL trimethylamine (TMA) and 27.4 mL epichloriohydrin (ECH) were mixed at the molar ratio of 10:7 and stirred overnight in an ice-salt bath (NaCl/Ice=1:3) to get epoxypropyl trimethylammonium chloride. Then, 12.5 g organsolv lignin was dissolved with 125 mL 20 wt. % NaOH in a flask at 80° C. warm bath for 20 min. After that, preparative epoxypropyl trimethylammonium chloride was added to the flask and reacted for 5 h until quanternary ammonium lignin (QAL), a brown-red emulsion, were obtained. The products was then dried and kept in fridge. To obtain lignin-clay nano hybrid, 5 g of bentonite clay was weighed and added into 400 mL of deionized water in a flask and stirred using magnetic stirring until a fine suspension was obtained. Then, 10 g modified lignin and 100 mL DI water was mixed with the clay suspension and reacted overnight for surface modification. The modified lignin-clay was separated from the aqueous phase using the centrifugation at 3500 rpm. The solid part was separated and washed with DI water and ethanol several times. Finally, the solid was dried using a freeze drier to get the lignin-clay nano hybrid.

Batch adsorption to adsorb Methyleneblue (MB), Zinc (Zn), Iron (Fe) and Copper (Cu). 20 mg of lignin-clay hybrid was added to 20 ml of 10 mg/L, 20 mg/L, 40 mg/L, 80 mg/L and 100 mg/L MB, Zn, Fe and Cu solution in 50 mL centrifuge tubes with three replications, respectively. The mixtures were shaken at 500 rpm for 24 h to reach balance at 25° C. The samples were then filtered and analyzed using a ultraviolet-visible spectroscopy. The percentages of all the solutes adsorption were calculated.

Preparation of Liquefied Peanut Shell. The liquefied Peanut Shell (LPS) was prepared by adding polyethylene glycol (800 mL) in a three-necked flask (1000 mL) equipped with a reflux condenser and magnet rotor. After preheated to 100° C., the reflux condenser was opened, and the magnetic stirring was set to rotate at a speed of 1000 rpm. The PS (200 g) was then poured into the flask inch by inch, mixed with the solution, refluxed and continuously stirred at 130° C. At the same time, sulfuric acid (25 mL) was added into the flask. The mixture was allowed to react for 1 h under the atmospheric pressure at 130° C. to convert cellulose into polyol. Finally, the LPS (biopolyols) was removed from the flask for analysis and used as one of the coating materials.

Preparation of Bio-polyurethane Coated Urea (BCU). Fertilizers with LPS polymer coating were prepared at the laboratory scale from 2 kg of urea prills. The prills were loaded into a rotating drum and preheated at 70±1° C. for 10 min. After the preheating stage, 20.0 g of a mixture of coating materials (13.3 g MDI, 6.67 g LPS) were dropped onto the surfaces of the rotating urea prills. The heat curing reaction of the mixed coating materials was finished in the rotating drum in 8-10 min, and the bio-based PU coating was then synthesized and attached to the surface of the urea prills. The weight of bio-based PU coating accounted for approximately 1 wt. % of that of the urea fertilizer. The coating process repeats 3 times to obtain BCU.

Preparation of Lignin-clay plus Bio-polyurethane Coated Urea (LBCU). The same coating method was also used to prepare LBCU. The 2 kg urea prills were preheated to 70±1° C. in the drum. Then, 20.0 g of three different mixtures of coating materials: 1) 2 g lignin-clay; 12 g MDI; 6 g LPS; 0.1 g MBA; 2) 4 g lignin-clay; 10.67 g MDI; 5.33 g LPS; 0.1 g MBA; 3) 6 g lignin-clay; 9.33 g MDI; 4.67 g LPS; 0.1 g MBA were poured onto the surfaces of the rotating urea prills. The lignin-clay contents were 10%, 20%, and 30% by weight in the mixed coating materials, respectively. The curing reaction of the mixed coating material was finished in the rotating drum in 8-10 min (FIG. 1). The weight of coating occupied approximately 1 wt. % of that of the urea fertilizer in each coating process. Three types of LBCU (LBCU1, LBCU2 and LBCU 3 with 10, 20, and 30% lignin-clay, respectively) were produced with different coating rates by repeating the coating process for 3 times.

Nitrogen Release Characteristics of the Coated Fertilizer. The percentages of N release from all the coated fertilizers in the first 24 h were measured in water at 25° C. With three replicates, 10 g of the coated fertilizer was placed in a plastic bottle containing 200 mL of deionized water and kept in an electroheating, standing-temperature incubator at 25±0.5° C. The N released from each of the coated fertilizers at 1, 3, 5, 7, 10, 14, 21, and 28 d, or until the cumulative N release of fertilizers reached over 80%. The N concentration was determined using the Kjeldahl method. The N release longevity of the coated fertilizers is defined as the time when the cumulative N release reached 80% of the total N.

Characterization of PCU and EMPCU Coatings. The lignin-clay, coatings of all coated fertilizers were dried at 40° C. for 24 h. Then they were pressed into powder, mixed with KBr powder, and then compressed to make pellets for Fourier transform infrared spectroscopy (FTIR, Thermo Scientific, MA, USA)) characterization at the wave number ranged from 500 to 4000 $cm^{-1}$. The morphologies of the lignin-clay and coatings layer were examined using scanning electron microscopy (SEM, Zeiss microscope EVO LS15, Germany) and energy dispersive X-ray spectroscopy (EDS) detector attached to SEM. Thermogravimetric analysis (TGA, TGA/DSC1, Mettler Toledo, USA) was employed to determine the lignin-clay using a thermal analyzer at a heating rate of 20° C./min until the temperature reached 1000° C. Transmission electron microscopy (TEM, JEOL instruments, MA, U.S.A.) was used to observe the morphology of the lignin-clay hybrid.

Plant assay. Matrix (600 g) was placed into a pot (height of 7 cm, and diameter of 10 cm (top) and 7 cm (bottom)). Six treatments were conducted: (1) Without any fertilizer designated as "CK1" group; (2) with potassium dihydrogen phosphate was designated as "CK2" group; (3) with potassium dihydrogen phosphate and urea was designated as "U" group; (4) with potassium dihydrogen phosphate, LBCU1 designated as "LRU1" group; (5) with potassium dihydrogen phosphate and LBCU2 designated as "LRU2" group; (6) with potassium dihydrogen phosphate and LBCU3 designated as "LRU3" group. Ten vegetable seeds were planted in the mixed matrix. All groups were cultivated in a green house at 25° C. for 30 days.

Results and Discussion

Morphologies of Lignin-clay. The SEM micrographs showed that the lignin-clay was small and nubbly (FIG. 2A). There are many layer structures on the lignin-clay (FIG. 2B). As shown in FIG. 2C, the surface of lignin-clay was rough and had many granules or bulges, which increased the specific surface area of the lignin-clay. The result indicated lignin-clay was successful synthesized and it may have strong adsorption capacity.

Figure 3:
FIG. 3 shows TEM of Lignin-clay.

The TEM was employed to further observe the morphologies of lignin-clay. As shown in FIG. 3, lignin-clay has lamellar structure, and the layer structure of lignin-clay was very clear. The size of lignin-clay is about 800-1000 nm. It indicated that lignin-clay was layer nano hybrid.

Figure 4:
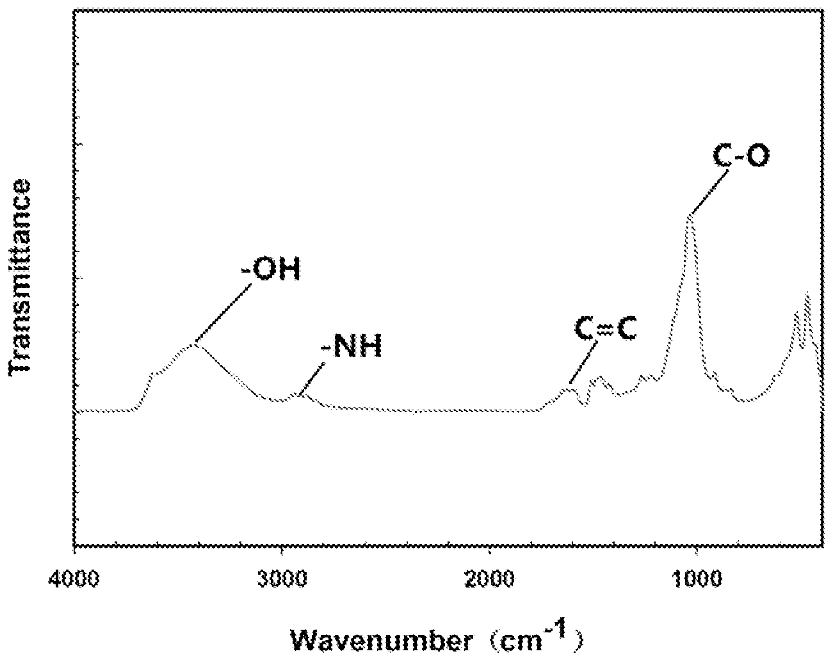
FIG. 4 shows FTIR of Lignin-clay.
Figure 5:
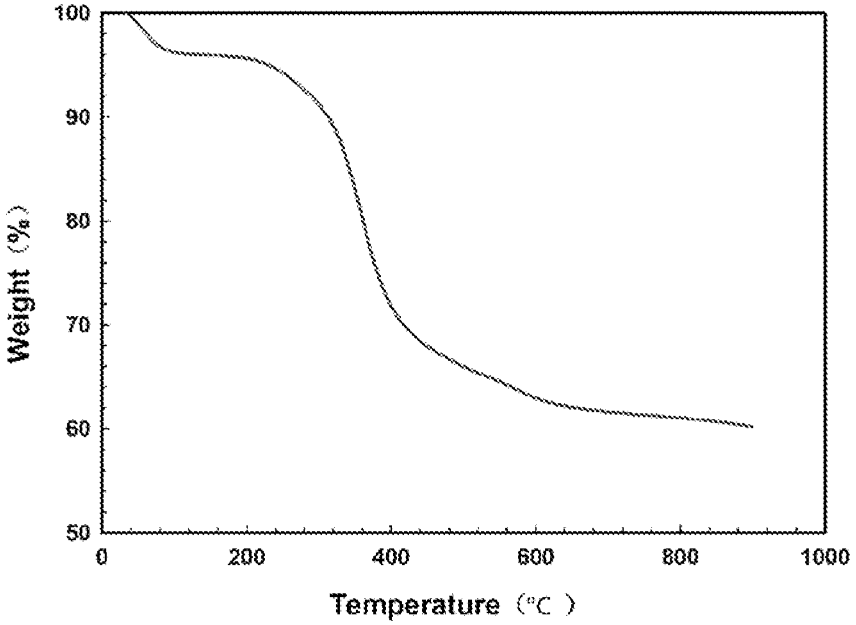
FIG. 5 shows TGA of Lignin-clay.

FTIR of Clay and Lignin-clay. The FTIR spectra of Lignin-clay revealed chemical shifts during the synthesis process (FIG. 4). The lignin-clay hybrid had the characteristic peak at the wavenumber of 1100, 1636, and 3416 $cm^{-1}$, which represent the C—O, C—H and —OH stretching, respectively. Also, the characteristic absorption peak of C═O at 1560 $cm^{-1}$ were observed in lignin-clay. Furthermore, lignin-clay hybrid had another characteristic peak at the wavenumber of 2950 $cm^{-1}$, which represented the —N—H bending. The result indicated that lignin had been loaded on the bentonite clay to form the lignin-clay hybrid.

Figure 2:
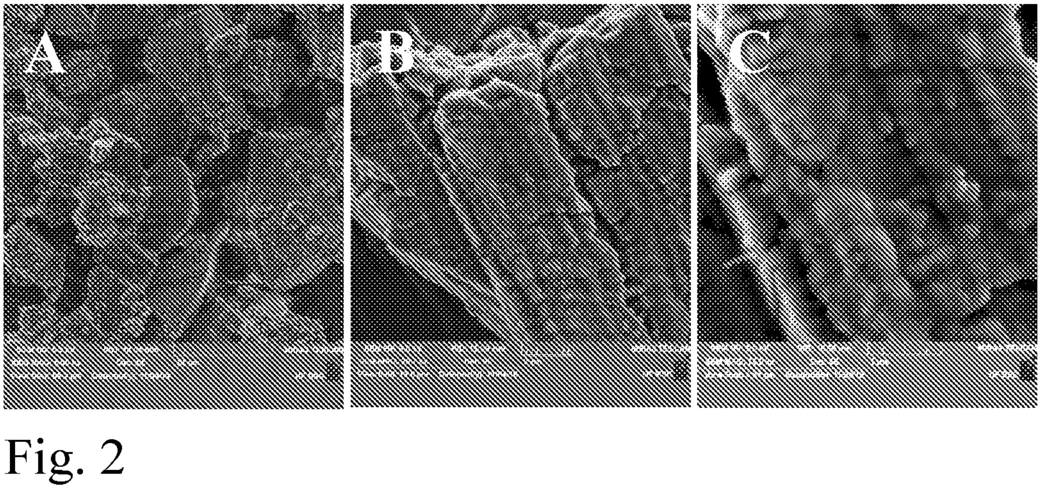
FIGS. 2A-2C show SEM of Lignin-clay at different magnification times.

TGA analysis of bentonite clay, lignin-clay hybrid, and organsolv. lignin. TGA analysis was conducted to determine the weight percentage of QAL loading on bentonite clay (FIG. 2). The lignin-clay hybrid had weight loss start at 30° C., and the fastest weight loss was at the temperature range between around 200° C. to around 600° C., which suggested that the QAL loaded on the bentonite clay was burned. Overall, the TGA data showed that lignin-clay hybrid had around 40% lignin loaded.

Figure 6:
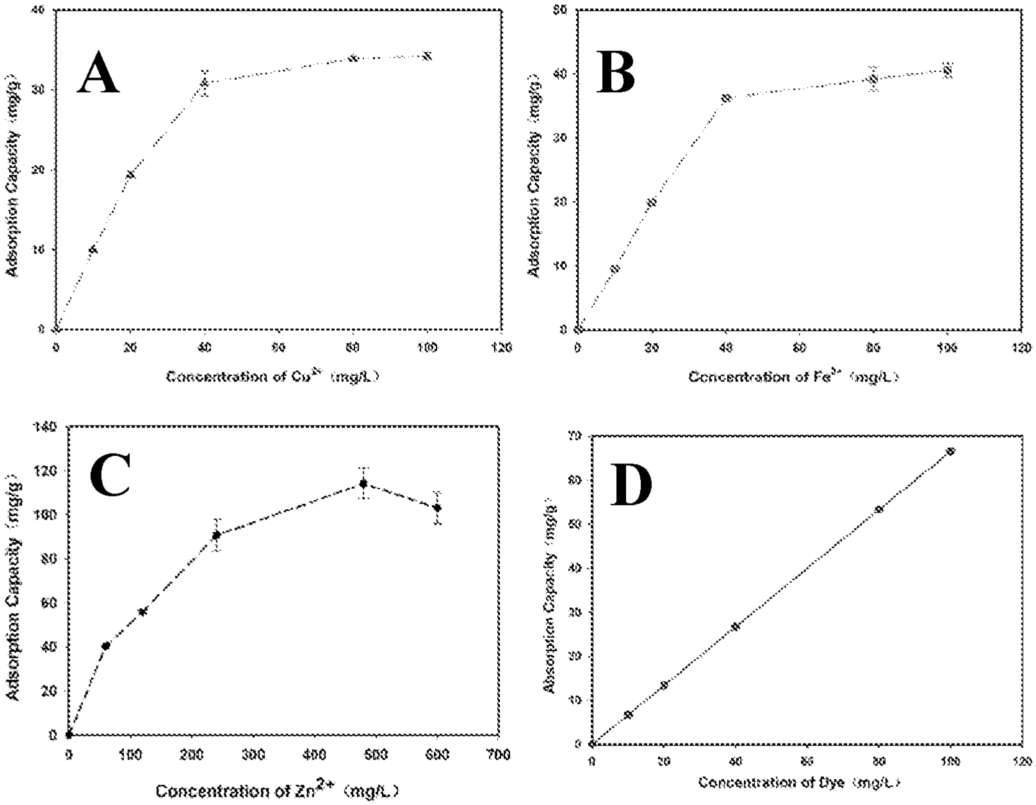
FIGS. 6A-6D show adsorption capacity of Lignin-clay for Cu, Zn, Fe and Methylene blue.

Adsorption capacity of Lignin-clay for $Cu^{2+}$, $Zn^{2+}$, $Fe^{2+}$, and MB. Five concentration levels (10, 20, 40, 80, and 100 mg/L) of $Cu^{2+}$, $Zn^{2+}$, $Fe^{2+}$ and MB solution were treated with 20 mg of lignin-clay hybrid, respectively. The adsorbed amounts of the $Cu^{2+}$, $Zn^{2+}$, $Fe^{2+}$ and MB increased with the initial solution concentrations, but the adsorption percentage decreased as the concentration of $Cu^{2+}$, $Zn^{2+}$, $Fe^{2+}$, and MB solution increased (FIG. 6). With the concentrations of $Cu^{2+}$, $Zn^{2+}$, $Fe^{2+}$ and MB increased, the lignin-clay hybrid and the $Cu^{2+}$, $Zn^{2+}$, $Fe^{2+}$ and MB had more chance to contact and collide, result in the increased adsorption. When the $Cu^{2+}$, $Zn^{2+}$, $Fe^{2+}$ and MB concentrations increased, the adsorption sites on the lignin-clay surface kept being occupied, which reduced the adsorption percentage and reached the equilibrium eventually. The $Cu^{2+}$, $Zn^{2+}$ and $Fe^{2+}$ adsorption capacity of lignin-clay is about 32,110 and 40 mg/g, respectively. And the MB adsorption capacity is over 70 mg/g, indicating that the lignin-clay has good adsorption to cations.

Figure 7:
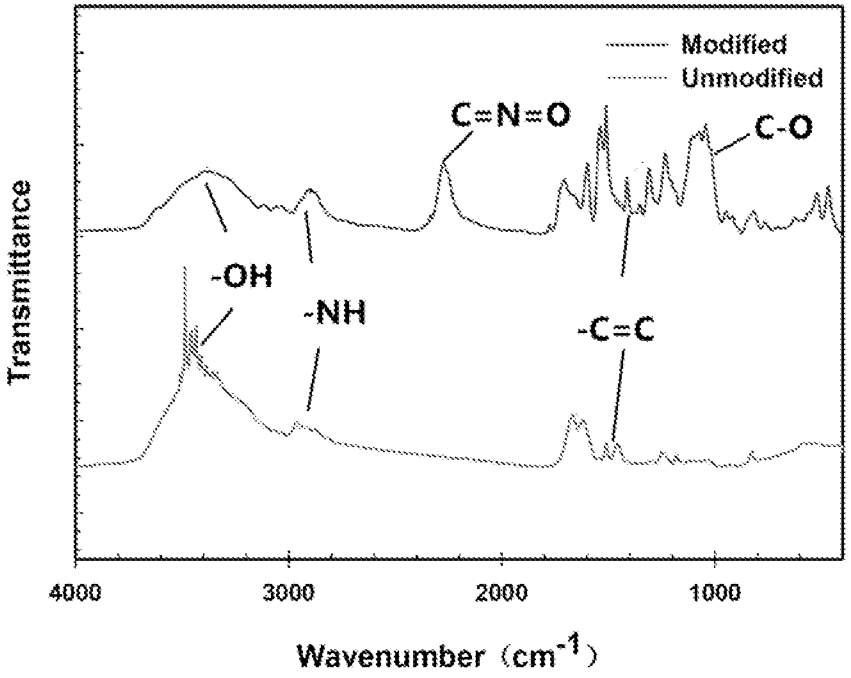
FIG. 7 shows FTIR of unmodified BCU* and Lignin-clay modified LBCU.

FTIR Analysis of BCU, LBCU1, LBCU2 and LBCU3. The FTIR spectra of Lignin-clay reveals chemical shifts during the synthesis process of polyurethane (FIG. 7). The absorption peaks of BCU shell observed at 3416 $cm^{-1}$ that represents —OH group, at 2986 $cm^{-1}$ is assigned to the stretching vibration of the N—H bond; at 1650 $cm^{-1}$ is assigned to stretching vibration of the βN-H bonding; and at 1227 $cm^{-1}$ are assigned to the stretching vibration of C—O—C bond. The results confirms that polyurethane is created by the reaction between LPS and MDI. In LBCU, except the above shared groups of BCU, there is particular peaks that represents the characteristic peak of lignin-clay at 2200 (C═N═O) and 1100 $cm^{-1}$ (C—O) for the modified LBCU, indicating that LBCU might carry the property of both lignin-clay and bio-polyurethane.

Figure 8:
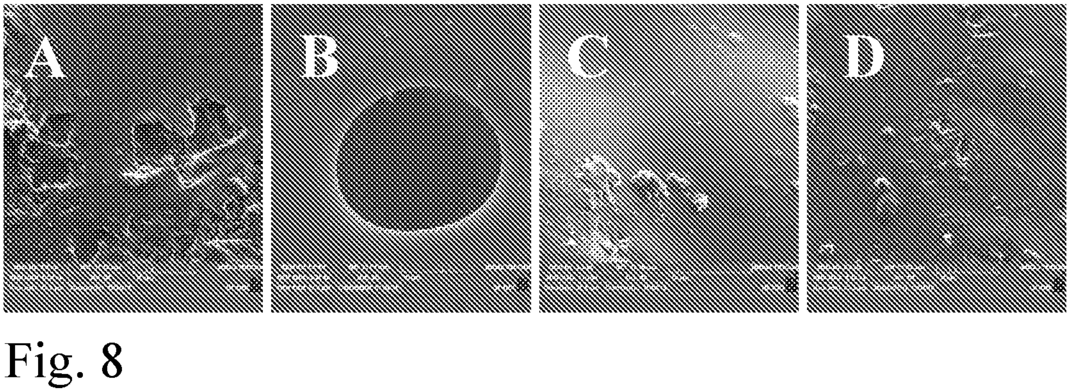
FIGS. 8A-D show SEM of Unmodified BCU (FIG. 8A) and Lignin-clay modified LBCU1 (FIG. 8B), LBCU2 (FIG. 8C) and LBCU3 (FIG. 8D).
Figure 9:
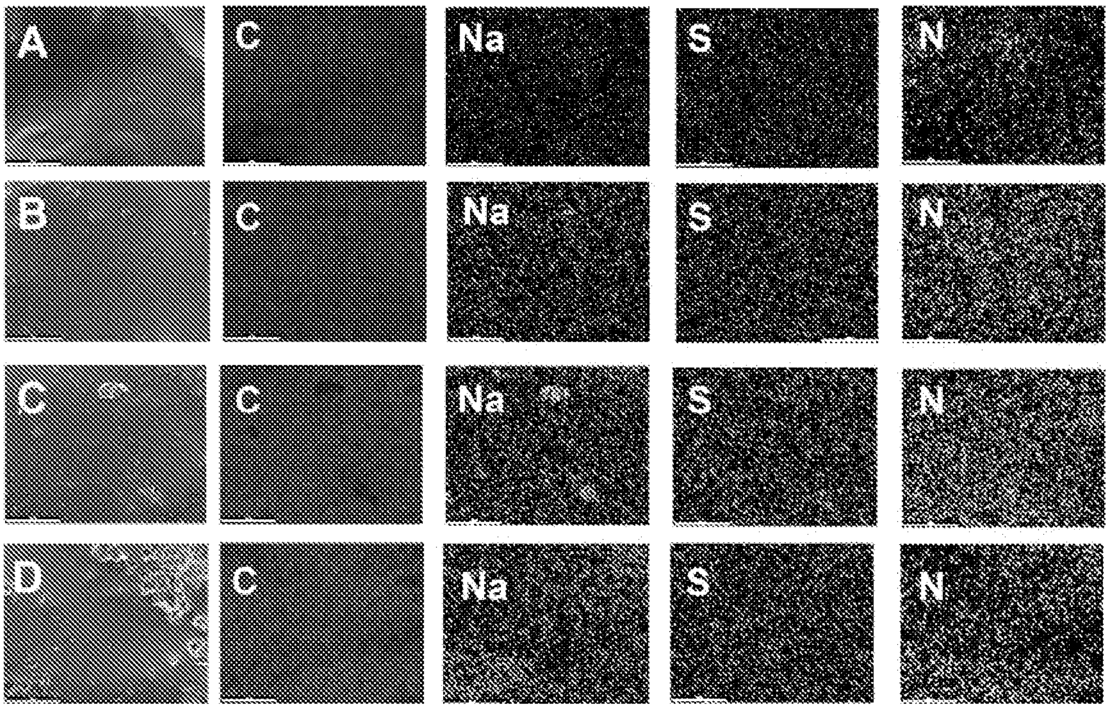
FIGS. 9A-D shows the SEM image and EDX mapping of Unmodified BCU (FIG. 9A) and Lignin-clay modified LBCU1 (FIG. 9B), LBCU2 (FIG. 9C) and LBCU3 (FIG. 9D).

The SEM Images of BCU, LBCU1, LBCU2 and LBCU3. The SEM micrographs showed that the surface of the coating shell of BCU was very irregularity with layered superposition phenomenon (FIG. 8 A1). Many pin holes and irregular structure were observed in the cross-section micrographs of the PCU shell (FIG. 8 A2). These pin holes and irregular structure might be easily permeated by water, causing quick release of nutrient from the coated fertilizer. When lignin-clay was added into the bio-based PU coating material, the surface of the coating shell of LBCUs (FIG. 8 B1, C1 and D1) was also much smoother than that of BCU. Furthermore, the pin holes and irregular structure of coating shells of LBCUs (FIG. 8 B2, C2 and D2) were much less than that of PCU, suggesting that the nano lignin-clay hybrid may lock the holes. When different amount of lignin-clay was used in the coating, the LBCU shells also exhibited different surface.

The EDX Mapping Images of BCU, LBCU1, LBCU2 and LBCU3. EDX mapping (FIGS. 9A, 9B, 9C and 9D) were used to measure the element amount and distributions on the surface of BCU, LBCU1, LBCU2 and LBCU3. The results not only testify the existence of certain elements on the coating surface, but also show their distributions. We observed C, Na, S and N elements on the surface of BCU because the peanut shell included the Na and S. After the lignin-clay modification, the amount of C, Na, S and N elements increased with the increasing of addition amount of lignin-clay. The reason is that C, Na, S and N are the main component elements of lignin-clay. It indicated the bio-polyurethane was successfully modified with lignin-clay.

Figure 10:
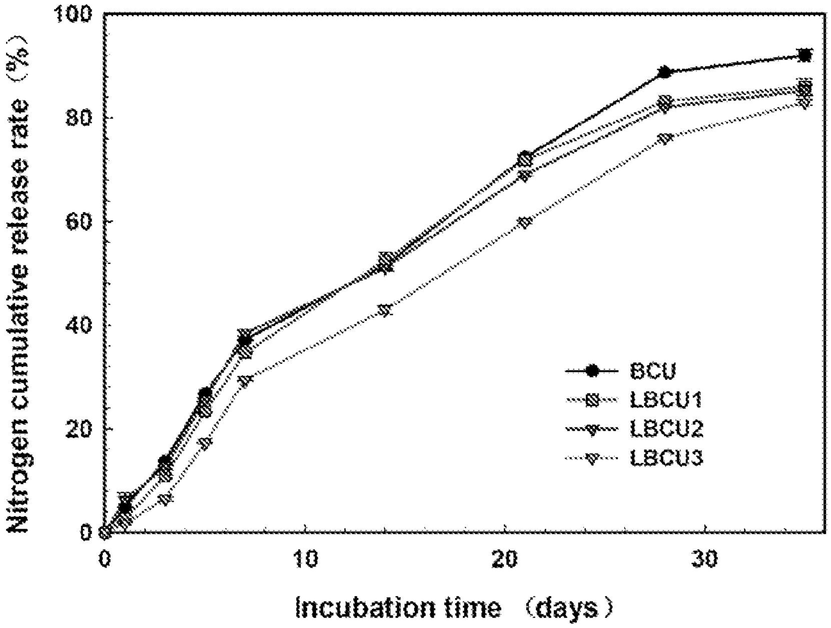
FIG. 10 shows release characteristics of Unmodified BCU and Lignin-clay modified LBCU.

Nitrogen Release Characteristics of PCU, ECU, and EMPCU. The release curves of different fertilizers coated with 3% coating materials showed that the N initial release rate of BCU reached 8% during the first day of incubation (FIG. 10). The corresponding N release rates were 4.7% for LBCU1, 4.1% for LBCU2, 3.6% for LBCU3. At the 30th day of incubation, the N release rates were over 80% for BCU, LBCU1 and LBCU2, 70% for LBCU3. Overall, the release rates of LBCUs were slower than that of BCU, and the release characteristics of LBCU3 was best. The N release characteristics of the coated fertilizers were significantly affected by the addition amount of lignin-clay. The controlled-release longevity increases with the increasing amount of its lignin-clay. The probable reason is that the hydrophobic lignin-clay blocks holes.

It can be seen from Table 3 that the fresh and dry weight of cherry radish in 6 groups of different treatments. The order of fresh weight of canopy is LRU2>LRU3>LRU1>U>CK2>CK1. The fresh weight of canopy in 6 groups is 1.82 g, 1.87 g, 8.00 g, 8.76 g, 13.18 g, 10.25 g, respectively. Compared with CK1 and CK2, treatment U significantly increased by 340.56% and 327.81%, treatment LRU1 significantly increased by 381.32% and 368.45%, and treatment LRU2 significantly increased by 624.18% and 604.81%, respectively. LRU3 significantly increased by 463.19% and 448.13% compared with CK1 and CK2. The order of root fresh weight was LRU2>LRU3>U>LRU1>CK2>CK1, and the fresh weight of root was 0.11 g, 0.14 g, 3.17 g, 3.04 g, 9.23 g, 6.77 g, respectively. As can be seen from Table 3, there is a significant difference between treatment U and treatment CK1 and CK2, but not between treatment LRU1 and U, and there is a significant difference between treatment LRU2 and 3 and treatment U, CK1 and 2. The order of dry weight of canopy is LRU2>LRU3>U>LRU1>CK2>CK1, which is consistent with the order of fresh weight of canopy, 0.12 g, 0.14 g, 0.78 g, 0.71 g, 0.99 g, 0.82 g, respectively. It can be seen that there is significant difference between treatment U and CK1, 2 and 3 and treatment CK1 and 2 groups. The order of root stem weight was LRU2>LRU3>LRU1>U>CK2>CK1, and their weights were 0.01 g, 0.02 g, 0.32 g, 0.59 g, 0.86 g, and 0.64 g, respectively. According to Table 3, it could be seen that treatment LRU1, 2, and 3 had significant differences in U. Treatment of LRU1, 2, and 3 was significantly different from treatment of CK1 and 2. The results showed that lignin coated urea fertilizer and urea fertilizer had significant effect on dry weight and fresh weight of cherry radish root.

TABLE 1

The fresh weight and dry weight with different treatments

| Treatment | Upground fresh weight/g | Ground fresh weight/g | Upground dry weight/g | Ground dry weight/g |
|---|---|---|---|---|
| CK1 | 1.82 c | 0.11 d | 0.12 c | 0.01 d |
| CK2 | 1.87 c | 0.14 d | 0.14 c | 0.02 d |
| U | 8.00 b | 3.17 c | 0.78 b | 0.32 c |
| LRU1 | 8.76 b | 3.04 c | 0.71 b | 0.59 b |
| LRU2 | 13.18 a | 9.23 a | 0.99 a | 0.86 a |
| LRU3 | 10.25 b | 6.77 b | 0.82 b | 0.64 b |

Figure 11:
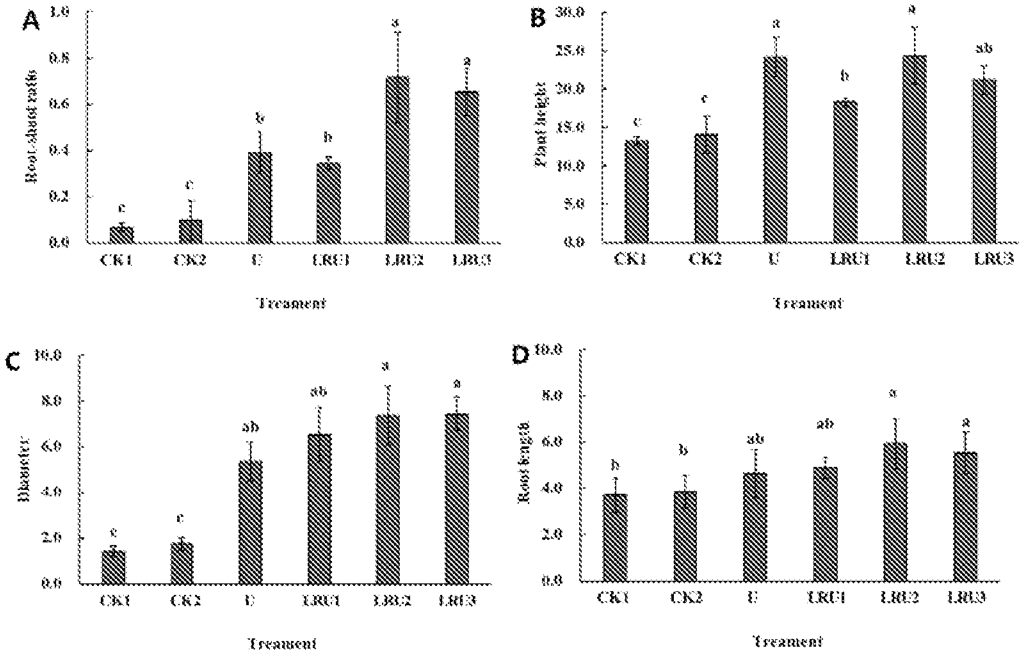
FIGS. 11A-11D illustrate root-shoot ratio (FIG. 11A), Plant height (FIG. 11B), Diameter (FIG. 11C) and Root length (FIG. 11D) of cherry radish with different treatments.

FIG. 11(A) shows the difference of root shoot ratio between different treatments. LRU1, LRU2, and LRU3 showed significant difference in root shoot ratio between CK1 and CK2, treatment LRU2 and 3 showed significant difference with treatment U, and treatment LRU1 showed no significant difference with treatment U. LRU2 treatment had the highest root shoot ratio and CK1 treatment had the lowest. The results showed that the root/shoot ratio of cherry radish treated with lignin coated urea was higher than that of cherry radish treated with urea and without fertilization. From the analysis results, we can know that there is a significant difference in root/shoot ratio of cherry radish after application of lignin coated urea and urea.

FIG. 11(B) shows the differences in plant height among different treatments of cherry radish. LRU1, LRU2, and LRU3 showed significant differences in plant height between CK1 and 2, while LRU2, LRU3, and U showed no significant differences, but LRU1 and U showed significant differences. LRU2 had the highest height, while CK1 had the lowest. The results showed that there was a significant difference between the cherry radish treated with lignin coated urea and ordinary urea, that is, the plant height of the cherry radish treated with lignin coated urea and ordinary urea was generally higher than that without chemical fertilizer. Therefore, it can be seen from the analysis results that there is a significant difference between the cherry radish without chemical fertilizer and the cherry radish with lignin coated urea and urea.

FIG. 11(C) shows the difference of stem diameter among different treatments of cherry radish, LRU1, LRU2, and LRU3 have significant difference compared with treatment CK1 and CK2, but there is no significant difference between treatment U and treatment LRU1, LRU2 and LRU3, and the highest plant height among the six groups is treatment LRU2, while the lowest plant height is treatment CK1. Therefore, we can know that there is a significant difference in the treatment of cherry radish applying lignin coated urea and ordinary urea compared with that without chemical fertilizer, that is, the stem diameter of cherry radish applying lignin coated urea and ordinary urea is higher than that of cherry radish without chemical fertilizer. From the analysis results, we can know that lignin coated urea and urea cherry radish have significant difference on cherry radish without chemical fertilizer.

FIG. 11(D) shows the significant difference of root length between different treatments of cherry radish, LRU2 and LRU3 are significantly different from CK1 and CK2, but there is no significant difference between TREATMENT U and LRU1 and CK1 and CK2. Among them, treatment LRU2 has the longest root length, while treatment CK1 has the shortest root length. Therefore, we can conclude that there is a significant difference between the cherry radish applying lignin coated urea and ordinary urea and the cherry radish without chemical fertilizer, that is, the root length of the cherry radish applying lignin coated urea and ordinary urea is longer than the cherry radish without chemical fertilizer. From the analysis results, we can know that lignin coated urea and ordinary urea cherry radish on the cherry radish without chemical fertilizer has significant difference.

CONCLUSION

A new strategy involving epoxidation and modification was successfully used in the producing of nano lignin-clay hybrid. The batch adsorption experimental results showed that the lignin-clay has stronger adsorption capacity for the $Cu^{2+}$, $Zn^{2+}$ and $Fe^{2+}$ and MB with the adsorption capacity of 32, 110, 40 and over 70 mg/g, respectively. A bio-based polyurethane for fertilizer coating was derived from the liquefied peanut shell, a readily available byproduct of agriculture. Lignin-clay was used to modify the bio-based coating material to improve its adsorptive property and controlled-release properties. The new coated fertilizer exhibited excellent controlled-release characteristics with the N release longevity of more than one month. This study provides a new strategy of achieving two goals with one stone, this kind of material that is derived from renewable biological materials had the stronger adsorption to the heavy metals, which is renewable low cost, easy degradation, therefore, this new coated fertilizer was applied to the soil can not only effectively improve the utilization rate of fertilizer, but also can efficiently adsorb heavy metals in soil and remediation of contaminated soil. The results also showed that the yield of lignin coated urea treatment increased by 374.89%, 614.50% and 455.70% g on average, and the growth indexes were better than those of without fertilizer treatment and ordinary urea fertilizer treatment. This novel coating technology thus has great potential for large-scale applications to satisfy the increasing demand for fertilizers because it is economical and environmentally friendly.

REFERENCES FOR EXAMPLE 1

[1] S. Zhang, Y. Yang, B. Gao, Y. C. Li, Z. Liu, Superhydrophobic controlled-release fertilizers coated with bio-based polymers with organosilicon and nano-silica modifications, *J. Mater. Chem. A.* 5 (2017) 19943-19953.

[2] S. G. Zhang, Y. Yang, W. Zhai, Z. Tong, T. Shen, Y. C. Li, M. Zhang, G. C. Sigua, J. Chen, F. Ding, Controlled-release nitrogen fertilizer improved lodging resistance and potassium and silicon uptake of rice, *Crop Sci.* 59 (2019) 1-8.

[3] S. Zhang, Y. Yang, Z. Tong, B. Gao, N. Gao, T. Shen, Y. C. Li, Y. Wan, Z. Yu, L. Liu, X. Ma Y. Guo. Layer-by-Layer Self-Assembly of Hydrophobic and Self-Healing Bio-nanocomposite-Coated Controlled Release Fertilizer. *ACS Applied Materials and Interfaces.* 2020, 12, 24, 27598-27606.

[4] S. Zhang, Y. Yang, B. Gao, Y. Wan, Y. C. Li, C. Zhao, Bio-based interpenetrating network polymer composites from locust sawdust as coating material for environmentally friendly controlled-release urea fertilizers, *J. Agric. Food Chem.* 64 (2016) 5692-5700.

[5] S. Zhang, T. Shen, Y. Yang, Y. C. Li, Y. Wan, M. Zhang, Y. Tang, S. C. Allen, Controlled-release urea reduced nitrogen leaching and improved nitrogen use efficiency and yield of direct-seeded rice, *J. Environ. Manage.* 220 (2018) 191-197.

[6] S. Zhang, N. Gao, T. Shen, Y. Yang, B. Gao, Y. C. Li, Y. Wan, One-Step Synthesis of Superhydrophobic and multifunctional nano copper modified bio-polyurethane for controlled-release fertilizer with "multilayer air shields": new insight of improvement mechanism, *J. Mater. Chem. A* 7 (2019) 9503-9509.

[7] Azeem, B.; KuShaari, K. Z.; Zakaria, B. M.; Basit, A.; Thanh, T. H. Review on materials & methods to produce controlled release coated urea fertilizer. *J. Control. Release.* 2014, 181, 11-21.

[8] Angst, G., Mueller, K. E., Kögel-Knabner, I., Freeman, K. H., Mueller, C. W. Aggregation controls the stability of lignin and lipids in clay-sized particulate and mineral associated organic matter. *Biogeochemistry* 2017, 132, 307-324.

[9] Albadarin, A. B., Collins, M. N., Naushad, M., Shirazian, S., Walker, G., Mangwandi, C. Activated lignin-chitosan extruded blends for efficient adsorption of methylene blue. *Chem. Eng. J.* 2017, 307, 264-272.

[10] Bai, L., Greca, G. L., Xiang, W., Lehtonen, J., Huan, S., Nugroho, R. W. N., Tardy, B. L., Rojas, O. J. Adsorption and assembly of cellulosic and lignin colloids at oil/water interfaces. *Langmuir* 2019, 35, 571-588.

[11] Bolana, N., Kunhikrishnan, A., Thangarajan, R., Kumpiene, J., Park, J., Makino, T., Kirkham, M. B. Scheckel, K. Remediation of heavy metal(loid)s contaminated soils—To mobilize or to immobilize? *J. Hazard-.Mater.* 2014, 266, 141-166.

[12] Budnyak, T. M., Aminzadeh, S., Pylypchuk, I. V., Sternik, D., Tertykh, V. A., Lindstrom, M. E., Sevastyanova, O. Methylene blue dye sorption by hybrid materials from technical lignins. *J. Environ. Chem. Eng.* 2018, 6, 4, 4997-5007.

[13] Chen, J.; Lü, S.; Zhang, Z.; Zhao, X.; Li, X.; Ning, P.; Liu, M. Environmentally friendly fertilizers: a review of materials used and their effects on the environment. *Sci. Total Environ.* 2018, 613-614: 829-839.

[14] Cruz, D. F.; Bortoletto-Santos, R.; Guimãrdes, G. G. F.; Polito, W. L.; Ribeiro, C. Role of polymeric coating on the phosphate availability as a fertilizer: insight from phosphate release by castor polyurethane coatings. *J. Agric. Food. Chem.* 2017, 65(29): 5890-5895.

[15] Cottet, L., Almeida, C. A. P., Naidek, N., Viante, M. F., Lopes, M. C., Debacher, N. A. Adsorption characteristics of montmorillonite clay modified with iron oxide with respect to methylene blue in aqueous media. *Appl. Clay Sci.* 2014, 95, 25-31.

[16] Fertahi, S., Bertrand, I., Amjoud, M., Oukarroum, A., Arji, M., Barakat, A. Properties of coated slow-release triple superphosphate (TSP) fertilizers based on lignin and carrageenan formulations. *ACS Sustainable Chem. Eng.* 2019, 7, 10371-10382.

[17] Ge, Y., Li, Z. Application of lignin and its derivatives in adsorption of heavy metal ions in water: A Review. *ACS Sustainable Chem. Eng.* 2018, 6, 7181-7192.

[18] Guo, T., Lou, C., Zhai, W., Tang, X., Hashmi, M. Z., & Murtaza, R., et al. Increased occurrence of heavy metals, antibiotics and resistance genes in surface soil after long-term application of manure. *Sci. Total Environ.* 2018, 635, 995-1003.

[19] He, Z., Shentu, J., Yang, X., Baligar, V. C., Zhang, T., Stoffella, P. J. Heavy metal contamination of soils: sources, indicators, and assessment. *J. Environ. Indicators.* 2015, 9, 17-18.

[20] Hu, J., Zhang, Q., Lee, D. Kraft lignin biorefinery: A perspective. *Bioresource Technol.* 2018, 247, 1181-1183.

[21] Huang, C.; Ragauskas, A. J.; Wu, X.; Huang, Y.; Zhou, X.; He, J.; Huang, C.; Lai, C.; Li, X.; Yong, Q. Co-production of bio-ethanol, xylonic acid and slow-release nitrogen fertilizer from low-cost straw pulping solid residue. *Bioresour. Technol.* 2018, 250: 365-373.

[22] Jin, Y., Zeng, C., Lu, Q., Yu, Y. Efficient adsorption of methylene blue and lead ions in aqueous solutions by 5-sulfosalicylic acid modified lignin. *Int. J. Biol. Macromol.* 2019, 123, 50-58.

[23] Jairam, S., Tong, Z., Wang, L., Welt, B. Encapsulation of a biobased lignin—saponite nanohybrid into polystyrene co-butyl acrylate (PSBA) latex via miniemulsion polymerization. *ACS Sustain. Chem. Eng.* 2013, 1, 12, 1630-1637

[24] Jiang, C. Wang, X, Qin, D. Da, W., Hou, B., Hao, Chen., Wu J. Construction of magnetic lignin-based adsorbent and its adsorption properties for dyes. *J. Hazard. Mater.* 2019, 369, 50-61.

[25] Jaishankar, M., Tseten, T., Anbalagan, N., Mathew, B. B., Beeregowda, K. N. Toxicity, mechanism, and health effects of some heavy metals. *Interdiscip. Toxicol.* 2014, 7, 60-72.

[26] Khalid, S., Shahid, M., Niazi, N. K., Murtaza, B., Bibi, I., Dumat, C. A comparison of technologies for remediation of heavy metal contaminated soils. *J. Geochem. Explor.* 2017, 182, 247-268.

[27] Kottegoda, N.; Sandaruwan, C.; Priyadarshana, G.; Siriwardhana, A.; Rathnayake, U. A.; Arachchige, D. M.; Kumarasinghe, A. R.; Dahanayake, D.; Karunaratne, V.; Amaratunga, G. A. J. Urea-hydroxyapatite nanohybrids for slow release of nitrogen. *ACS Nano* 2017, 11(2): 1214-1221.

[28] Kai, D.; Tan, M. J.; Chee, P. L.; Chua, Y. K.; Yap Y. L.; Loh, X. J. Towards lignin-based functional materials in a sustainable world. *Green Chem.* 2016, 18, 1175-1200.

[29] Kong, Y., Wang, L., Ge, Y., Su, H., Li, Z. Lignin xanthate resin—bentonite clay composite as a highly effective and low-cost adsorbent for the removal of doxycycline hydrochloride antibiotic and mercury ions in water. *J. Hazard. Mater.* 2019, 368, 33-41.

[30] Kaneko, H., Ishii, R., Suzuki, A., Ebina, N. T. T., Nge, T. T., Yamada, T. Flexible clay glycol lignin nanocomposite film with heat durability and high moisture-barrier property. *Appl. Clay Sci.* 2016, 132-133, 425-429.

[31] Liu, Y., Kang, Y., Mu, B., Wang, A. Attapulgite/bentonite interactions for methylene blue adsorption characteristics from aqueous solution. *Chem. Eng. J.* 2014, 237, 403-410.

[32] Li, X., Zheng, D., Zheng, T., Lin, X., Lou, H., Qiu, X. Enhancement clay tolerance of PCE by lignin-based polyoxyethylene ether in montmorillonite-contained paste. *J. Industrial Eng Chem.* 2017, 49, 168-175.

[33] Li, J., Han, X., Zhang, X., et al. Capture of nitrogen dioxide and conversion to nitric acid in a porous metal—organic framework. *Nature Chem.* 2019, 11, 1085-1090.

[34] Liao, Y., Koelewijn, S., Bossche, G. V., et al. A sustainable wood biorefinery for low-carbon footprint chemicals production. *Science.* 2020,367,6484, 1385-1390.

[35] Liu, L., Li, W., Song, W., Guo, M. Remediation techniques for heavy metal-contaminated soils: Principles and applicability. *Sci. Total Environ.* 2018, 633, 206-219.

[36] Llevot, A.; Grau, E.; Carlotti, S.; Grelier, S.; Cramail, H., From Lignin-derived Aromatic Compounds to Novel Biobased Polymers. *Macromol. Rapid Comm.* 2016, 37 (1), 9-28.

[37] Legras-Lecarpentier, D., Stadler, K., Weiss, R., Guebitz, G. M., Nyanhongo, G. S. Enzymatic synthesis of 100% lignin biobased granules as fertilizer storage and controlled slow release systems. *ACS Sustainable Chem. Eng.* 2019, 7, 12621-12628.

[38] Li, F., Wang, X., Yuan T., Sun, R. A lignosulfonate-modified graphene hydrogel with ultrahigh adsorption capacity for Pb(II) removal. *J. Mater. Chem. A.* 2016, 4, 11888-11896.

[39] Leskinen, T., Witos, J., Valle-Delgado, J. J., Lintinen, K., Kostiainen, M., Wiedmer, S. K. Österberg, M., Mattinen, M. L. Adsorption of proteins on colloidal lignin particles for advanced biomaterials. *Biomacromolecules* 2017, 18, 2767-2776.

[40] Patrícia F., Kalle L., Jouni T. Hirvonen, Mauri A. Kostiainen, Hélder A. Santos. Properties and chemical modifications of lignin: Towards lignin-based nanomaterials for biomedical applications. *Prog. Mater. Sci.* 2018, 93, 233-269.

[41] Párraga-Aguado, I., Álvarez-Rogel, J., González-Alcaraz, M. N., et al. Metal mobility assessment for the application of an urban organic waste amendment in two degraded semiarid soils. *J. Geochem.Explor.* 2017, 173, 92-98.

[42] Ponomarev, N., Pastushok, O., Repo, E., Doshi, B., Sillanpaa, M. Lignin-based magnesium hydroxide nanocomposite. synthesis and application for the removal of potentially toxic metals from aqueous solution. *ACS Applied Nano Mater.* 2019, 2, 5492-5503.

[43] Popovic, A., Rusmirovic, D. J., Velickovic, Z., Radovanovic, Z., Ristic, M., Pavlovic, P. V., Marinkovic, D. A. Novel amino-functionalized lignin microspheres: High performance biosorbent with enhanced capacity for heavy metal ion removal. *Inter. J. Biolog. Macromol.* 2019, DOI: 10.1016/j.ijbiomac.2019.11.152.

[44] Ralph, J., Mackay, J. J., Hatfield, R. D., et al. Abnormal lignin in a loblolly pine. *Science,* 1997, 277(5323):235-239.

[45] Ragauskas, A. J.; Beckham, G. T.; Biddy, M. J.; Chandra, R.; Chen, F.; Davis, M. F.; Davison, B. H.; Dixon, R. A. Gilna, P.; Keller, M.; Langan, P.; Amit K. Naskar, A. K; Saddler, J. N.; Tschaplinski, T. J.; Tuskan, G. A.; Wyman, C. E. Lignin valorization: improving lignin processing in the biorefinery. *Science,* 2014, 344, 1246843.

[46] Supanchaiyamat, N., Jetsrisuparb, K., Knijnenburg, J. T. N., Tsang, D. C. W., Hunt, A. J. Lignin materials for adsorption: Current trend, perspectives and opportunities. *Bioresource Technol.* 2019, 272, 570-581.

[47] Sun, Z., Fridrich, B., Santi, A. D., Elangovan, S., Barta, K. Bright side of lignin depolymerization: toward new platform chemicals. *Chem. Rev.* 2018, 118, 614-678.

[48] Schutyser, W., Renders, T., Van den Bosch, S., Koelewijn, S.-F., Beckham G. T., Sels, B. F. Chemicals from lignin: an interplay of lignocellulose fractionation, depolymerisation, and upgrading. *Chem. Soc. Rev.* 2018, 47, 852-908.

[49] Thakur, V. K.; Thakur, M. K. Recent advances in green hydrogels from lignin: a review. *Int. J. Biol. Macromol.* 2015, 72, 834-847.

[50] Wang, X., Jiang, C., Hou, B., Wang, Y., Hao, C., Wu. J. Carbon composite lignin-based adsorbents for the adsorption of dyes. *Chemosphere* 2018, 206, 587-596.

[51] Wang, X.; LU, S.; Gao, C.; Feng, C.; Xu, X.; Bai, X.; Gao, N.; Yang, J.; Liu, M.; Wu, L. Recovery of ammonium and phosphate from wastewater by wheat straw-based amphoteric adsorbent and reusing as a multifunctional slow-release compound fertilizer. *ACS Sustainable Chem. Eng.* 2016, 4(4): 2068-2079.

[52] Xiao, X.; Yu, L.; Xie, F.; Bao, X.; Liu, H.; Ji, Z.; Chen, L. One-step method to prepare starch-based superabsorbent polymer for slow release of fertilizer. *Chem. Eng. J.* 2017, 309: 607-616.

[53] Yao, Z., Li, J Xie, H., Yu, C. Reviewon remediation technologies of soil contaminated by heavy metals. *Procedia Environ. Sci.* 2012, 16, 722-729.

[54] Zhang, S., Wang, Z., Zhang, Y., Pan, H., Tao, L. Adsorption of methylene blue on organosolv lignin from rice straw. *Procedia Environ. Sci.* 2016b, 31, 3-11.

[55] Zhang, S.; Yang, Y.; Gao, B.; Wan, Y.; Li, Y. C.; Zhao, C. Bio-based interpenetrating network polymer composites from locust sawdust as coating material for environmentally friendly controlled-release urea fertilizers. *J. Agric. Food Chem.* 2016a, 64(28): 5692-5700.

[56] Zhang, Y., Nie, S., Wang, X., Zhang, W., Lagerquist, L., Qin, M., Willför, S., Xu, C., Fatehi, P. Ultrafast adsorption of heavy metal ions onto functionalized lignin-based hybrid magnetic nanoparticles. *Chem. Engin. J.* 2019, 372, 82-91.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of “about 0.1 percent to about 5 percent” should be interpreted to include not only the explicitly recited concentration of about 0.1 weight percent to about 5 weight percent but also include individual concentrations (e.g., 1 percent, 2 percent, 3 percent, and 4 percent) and the sub-ranges (e.g., 0.5 percent, 1.1 percent, 2.2 percent, 3.3 percent, and 4.4 percent) within the indicated range. The term “about” can include traditional rounding according to significant figures of the numerical value. In addition, the phrase “about ‘x’ to ‘y’” includes “about ‘x’ to about ‘y’”.

Many variations and modifications may be made to the above-described aspects. All such modifications and variations are intended to be included herein within the scope of this disclosure and protected by the following claims.

The invention claimed is:

1. A slow-release fertilizer composition comprising:
a coating comprising a plurality of lignin-clay nanohybrids and polyurethane; and
a core comprising a fertilizer.

2. The composition of claim 1, wherein the polyurethane is the reaction product of precursors comprise a polyol and a polyisocyanate.

3. The composition of claim 2, wherein the polyisocyanate is selected from the group consisting of diphenylmethane diisocyanate, toluene diisocyanate, polymers thereof, and mixtures thereof.

4. The composition of claim 3, wherein the polyisocyanate is diphenylmethane diisocyanate.

5. The composition of claim 2, wherein polyol is a reaction product of polyethylene glycol and liquefied peanut shell.

6. The composition of claim 1, wherein the lignin-clay nanohybrid is a reaction product of polyethylene glycol and quaternary ammonium lignin and clay.

7. The composition of claim 6, wherein the clay is selected from the group consisting of a zeolite, a bentonite, an aluminosilicate, a montmorillonite, a smectite, a kaolinite, an organoclay, and mixtures thereof.

8. The composition of claim 7, wherein the clay is bentonite.

9. The composition of claim 1, wherein the lignin-clay nanohybrid comprises modified lignin and clay.

10. The composition of claim 1, wherein lignin compound in the lignin-clay nanohybrid is about 20 wt % to about 50 wt % of the lignin-clay nanohybrid.

11. The composition of claim 1, wherein the lignin-clay nanohybrid is about 1 wt % to about 40 wt % of the coating.

12. The composition of claim 1, wherein the coating is about 0.1 wt % to about 20 wt % of the composition.

13. The composition of claim 1, wherein the fertilizer is a water-soluble compound having nitrogen, phosphorous, or potassium.

14. The composition of claim 1, wherein the fertilizer is urea.

15. A method for making a slow-release fertilizer composition, comprising:
preheating a fertilizer particle to a temperature of about 50-100° C.;
adding a mixture to surface of the preheated fertilizer particle, wherein the mixture comprises a plurality of lignin-clay nanohybrids and polyurethane precursors;
reacting the polyurethane precursors to form a coating on the fertilizer particle, wherein the coating comprises a polyurethane and the lignin-clay nanohybrids; and
thereby forming a slow-release fertilizer composition.

* * * * *